Nov. 17, 1931.  W. L. SIMMONS  1,832,252
PACKING LUBRICATOR
Filed Aug. 17, 1928

INVENTOR.
W. L. SIMMONS.
BY
ATTORNEY

Patented Nov. 17, 1931

1,832,252

UNITED STATES PATENT OFFICE

WILLIAM L. SIMMONS, OF REDONDO BEACH, CALIFORNIA

PACKING LUBRICATOR

Application filed August 17, 1928. Serial No. 300,300.

My invention relates to lubricating means, and more particularly to a means whereby the sucker rods may be lubricated when the well with which said rods are associated is not pumping oil, which condition in practice causes undue wear on said rods, no means, so far as I am aware, has ever before been provided for this purpose.

It accordingly is an object of my invention to provide a novel form of lubricating means and stuffing box associated therewith, the pipe union associated with the casing head pipe connections being equipped with cap screw-threaded thereto, a perforated or slotted sleeve being positioned over the sucker rods and inside said stuffing box, sets of packing members being positioned above and below said sleeve, there being also a means for conducting a lubricant to the inside of said sleeve and said rods.

It is also within the province of my invention to provide a means for turning the cap associated with my novel device, said means taking the form of a perforated extension associated with said cap, in which perforation a suitable implement may be inserted to turn said cap so that it may be adjusted toward or away from the packing means therein or said cap removed entirely, it being also within the province of my invention to shape said cap in the form of a nut so that a wrench may be applied thereto for the same purpose.

The above, and further objects and advantages of my invention, as will hereinafter more fully appear, I attain by the construction described in the specification and illustrated on the drawings, forming a part of my application.

Figure 3:
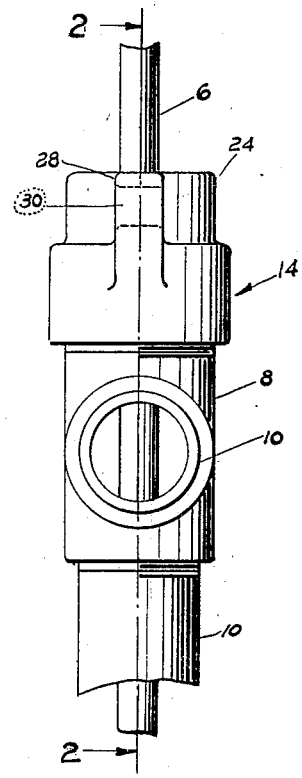
Figure 4:
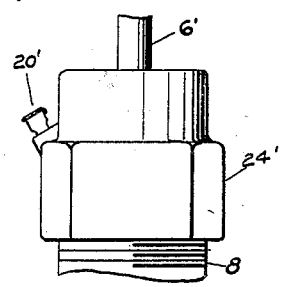

Reference is had to the accompanying drawings, in which similar reference characters denote similar parts. In the drawings, Fig. 1 is a fragmentary front elevational view of my invention applied to the walking beam sucker rods and pipe connections associated with an oil or other well, Fig. 2 is an enlarged vertical view of my invention Fig. 3 is an end elevational view of Fig. 2, and Fig. 4 is a fragmentary front elevational view of a modified form of my invention disclosing an alternative means for rotating the cap.

Describing my invention more in detail, my invention is adapted for special use in connection with the sucker rods of an oil well, wherein, when said well is not pumping oil, an efficient and effective means may be provided for lubricating said rods, which, in practice, soon become worn when subjected to said conditions.

Figure 1:
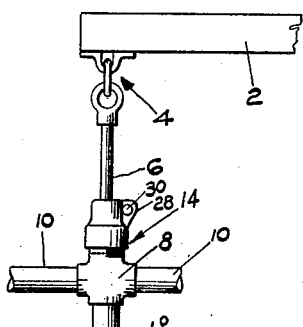

As seen in Fig. 1, the convention walking beam 2 has the usual connections 4 connected to the sucker rods 6 which pass through the union 8 of the pipe connections 10 associated with the well casing head 12 and I use said union 8 to position thereon the stuffing box or lubricating means designated generally by the numeral 14.

Figure 2:
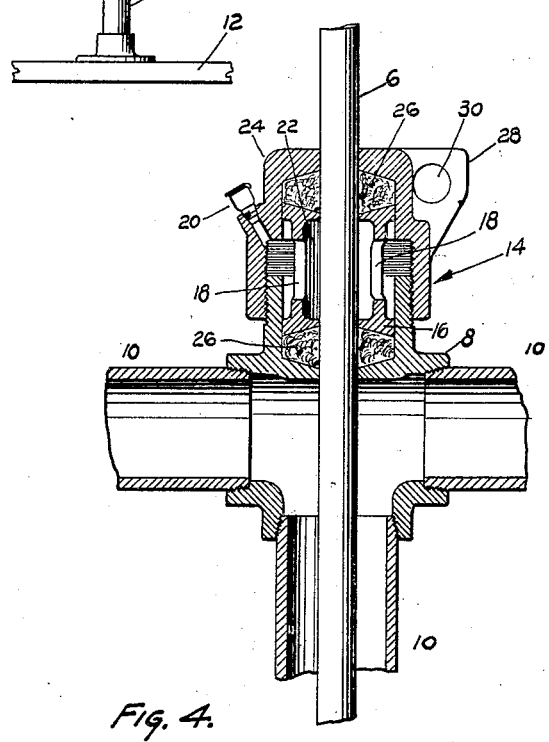

The stuffing box 14 comprises a perforated or slotted sleeve 16 closely fitting the rods 6, the slots or perforations 18 permitting the lubricant from the lubricating means 20, which in practice may take any form desired, the form shown being conventional, to be conducted through the perforations or slots 18 to the chamber 22 surrounding the rods 6, said means 20 being associated in any preferred way with the detachable cap 24, closely fitting the rods 6 and threaded to the union 8, as shown more particularly in Fig. 2.

Positioned above and below the sleeve 14 are sets of packing means 26 of any preferred construction, and the cap 24 is provided with an extension 28, provided with a perforation 30, which perforation may be engaged by a suitable implement so that the cap may be adjusted toward or away from the union 8, or said cap entirely detached therefrom. This provides an effective and efficient means for packing the rods 6, insuring that said rods are at all times lubricated when no oil is being pumped by the well.

In Fig. 4 I have shown a slight modification, in which the cap 24', surrounding the rods 6' made hexagonal in shape, to accommodate a wrench or other tool, the lubricating means 20' being also provided as in the other form of my invention.

It is of course to be distinctly understood that I do not limit my invention in its use to oil well practice, but on the contrary said invention may be used anywhere desired, as for example in lubricating pump rods, fluid pressure motors and the like; in fact, anywhere where a member is being reciprocated.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. In a lubricating device adapted for special use in connection with the sucker rods of a well, a pipe union through which said rods are adapted to extend, said union having a hollow externally threaded extension, a packing in said extension, a perforated sleeve in said extension and resting on said packing, said sleeve surrounding and closely fitting said rods, a second packing above said sleeve, a rotatable cap enclosing said packing and in threaded engagement with said extension, said cap being provided internally with portions of varying diameter interfitting with said sleeve, and means for introducing a lubricant in said extension and said sleeve.

2. A packing lubricator comprising an externally threaded member having an opening through which a rod to be lubricated is adapted to extend, an internally threaded cap detachably associated with said threaded member, and when positioned thereon, extends a substantial length thereof, said cap being provided internally with portions of varying diameters, a perforated sleeve in said member and in said cap, said sleeve having its periphery cut away to form an annular channel coacting with the interior of said cap to provide a lubricant space, a packing positioned in said cap and above said sleeve, and a second packing positioned in said member and below said sleeve, whereby said rod may be continually lubricated.

In testimony whereof I have signed my name to this specification.

WILLIAM L. SIMMONS.